Oct. 21, 1969 K. E. KRYLOW ET AL 3,474,423

SEMIPERMANENT ELECTROMECHANICALLY ALTERABLE MEMORY

Filed April 26, 1966 2 Sheets-Sheet 1

INVENTORS
KONSTANTY E. KRYLOW
WILLIAM A. REIMER

BY

Glenn H. Antrim

AGENT

Oct. 21, 1969 K. E. KRYLOW ET AL 3,474,423

SEMIPERMANENT ELECTROMECHANICALLY ALTERABLE MEMORY

Filed April 26, 1966 2 Sheets-Sheet 2

United States Patent Office 3,474,423

Patented Oct. 21, 1969

3,474,423
SEMIPERMANENT ELECTROMECHANICALLY ALTERABLE MEMORY

Konstanty E. Krylow, Chicago, and William A. Reimer, Wheaton, Ill., assignors to Automatic Electric Laboratories, Inc., Northlake, Ill., a corporation of Delaware Filed Apr. 26, 1966, Ser. No. 545,320
Int. Cl. G11b *5/00*
U.S. Cl. 340—174 3 Claims

ABSTRACT OF THE DISCLOSURE

A magnetic core matrix is integrated with a crossbar switch. A conductive spring wire at each crosspoint passes through a core of the matrix. Each spring wire is part of a single-turn write winding about its core, and engages a mating contact to short-circuit the winding when the crosspoint is operated. Address windings and read windings are provided on the cores to sense amount of change in magnetic flux.

Figure 1:
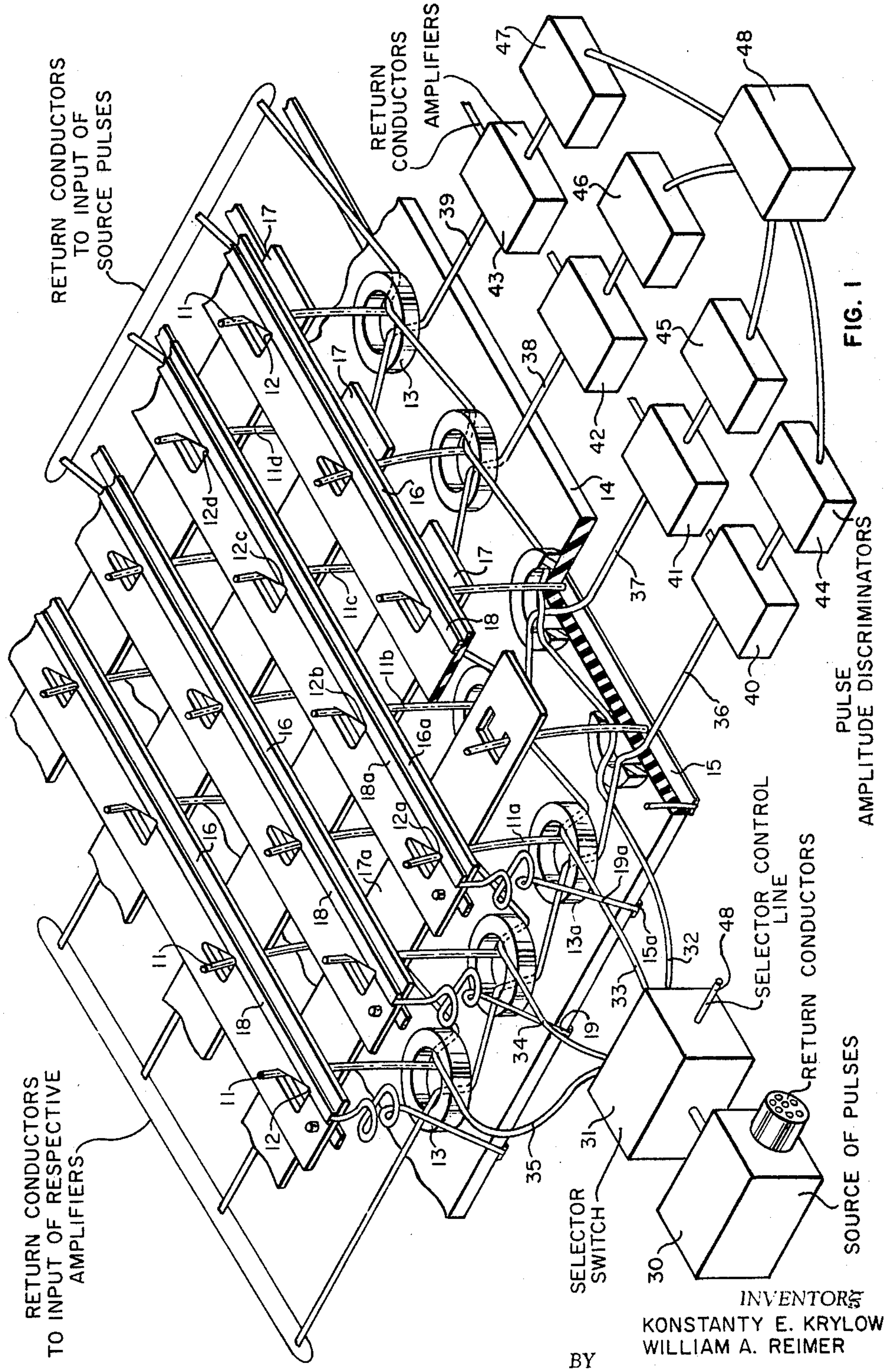

This invention pertains to electrical memories, and more particularly to semipermanent memories that are readily alterable.

Known semipermanent memories have different information entered by inserting memory cards or sheets with different electrical characteristics that correspond to different information. The cards have been used with various type circuits, for example with the type of circuits that comprise either inductive or capacitive elements arranged in a matrix. The matric has the usual columns of elements in one plane and rows of elements in an adjacent plane. Each element in a column is located adjacent a respective element in a row. The amount of coupling between the adjacent elements in the different planes is determined by the characteristic of an intermediate element on a memory card that is inserted between the planes that contain these elements.

In certain types of the prior memories that utilize replaceable cards, the information contained on the cards may be read very fast by electronic circuits. A column that contains desired information is addressed and its information is read on the different rows of the matrix within a few microseconds. A memory according to the present invention retains the capability of reading information rapidly.

The memories that use cards are generally altered by an operator who is present at the location of the memory. The operator prepares a new card with new information as required, and changes information by removing one card from between the columns and rows of the matrix and inserting another. Even though only one word that is contained in a single column of the matrix is to be changed, unchanged information along with new information for all columns must be recorded on each new card before it is inserted. A memory according to the present invention is altered rapidly from a remote location. Information may be changed in any selected number of columns at any time while other columns are left undisturbed. Information is stored mechanically, but it is read electrically; therefore, the memory can not be erased inadvertently by applying wrong voltages to the reading circuits.

The mechanical storage of information is accomplished by an actuator that is fundamentally a crossbar switch. The information is stored by closing combinations of contacts at the crosspoints along columns of a matrix of crosspoints. The condition of the contacts is sensed or read rapidly through corresponding magnetic cores that provide coupling to electronic circuits.

Each contact is engaged by a corresponding spring wire. Each spring wire has one end rigidly attached to a base, and its other end extending through an aperture of an actuator bar for a row and through an aperture of an actuator bar for a column. The shape of the apertures of the bars for the columns is different from the shape of the apertures of the bars for the rows so that in response to the sequential operation of a selected pair of bars, a selected spring wire is constrained and latched in an operated position. A contact is mounted at the edge of one of the apertures for each spring at such a point that it is engaged by the spring when it is in its operated position.

The contacts on the bars and the fixed ends of the spring wires are connected together so that a closed single turn is completed for each operated spring wire. Each of the spring wires pass through one of the magnetic cores to form a single turn winding that functions as a write winding. Therefore, operation of any spring wire closes, or short-circuits, a single turn winding of a respective core. The matrix of cores has address windings for columns and read windings or sense windings for rows. A column that contains a desired "word" of information is selected and then interrogated by applying a pulse to the windings of all the cores in that column. The read windings for each row are connected to a respective pulse amplitude discriminator. When a core is not short-circuited, a pulse of a certain amplitude is applied from its read winding to a respective discriminator in response to application of a pulse to its address winding. When the core is short circuited by operation of its respective spring wire, a pulse of substantially less amplitude is applied to the discriminator. As determined by the positioning of the spring wires, the discriminators in a suitable circuit provide an output in response to application of signal of one level, but no output in response to signal of the other level.

The usual crossbar switches that are used in automatic telephone offices are not directly adaptable for storing information because only one rather than any combination of crosspoints can be operated along a selected column and because the crosspoints are not latched independent of holding current. Certain switches that utilize the crossbar principle provide for simultaneous operation of crosspoints and for mechanical latching of the operated crosspoints. Switches of this construction, such as that described in U.S. Patent 3,061,819, Information Storage and Transfer Structure, issued to E. Rogal on Oct. 30, 1962, are adaptable for storing information. A memory according to the present invention includes a switch and an integral magnetic matrix. A feature of the switch is its simple construction. The magnetic matrix that is integrated with the switch facilitates fast interrogation and reading of information that is stored by positioning contacts of the switch.

An object of this invention is to provide a semi-permanent memory that can be altered readily from a remote location and accessed readily for reading information rapidly.

Another object is to provide in an electromechanical storage device, a matrix of elements that function as both coupling and isolating elements for connecting columns and rows to rapid operating energizing and reading circuits, respectively.

Figures 3A, 3B, 4, 5:
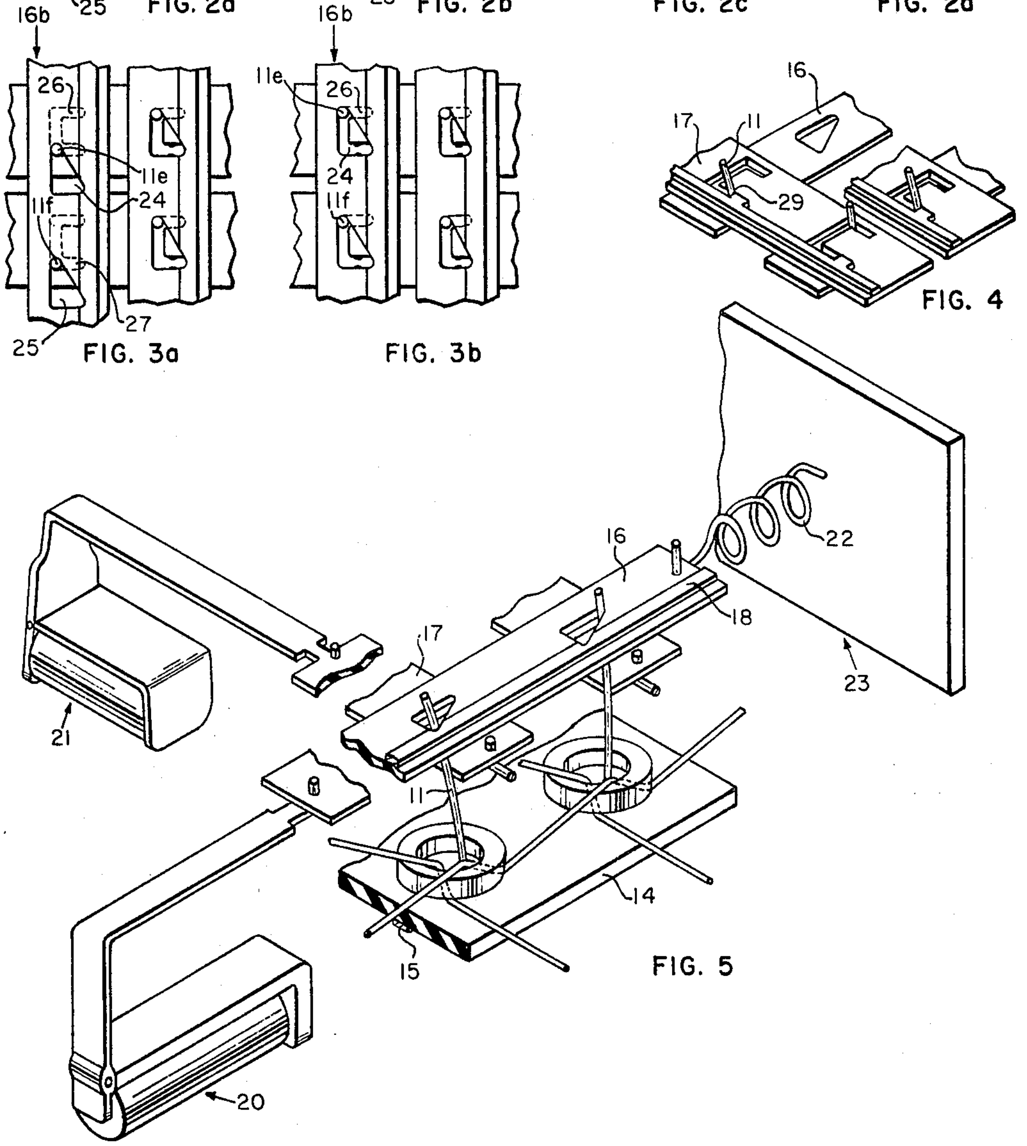

Other objects, features and advantages will be apparent, and the construction and operation of the invention better understood, with reference to the accompanying drawing, in which:

FIG. 1 is a perspective view of a portion of an embodiment of a memory constructed in accordance with this invention;

FIGS. 2*a*–2*d* are fragmentary views of crossbars to show successive motions for operating a crosspoint;

FIGS. 3*a* and 3*b* are fragmentary views of crossbars to show releasing of a crosspoint;

FIG. 4 is a fragmentary view of crossbars with contacts having locations different from those shown in previous figures; and FIG. 5 is a view of portions of the memory of FIG. 1 to show actuators that position the crossbars.

The general arrangement of component parts of the memory of this invention is shown in FIG. 1. A required number of substantially parallel spring wires 11 and corresponding contacts 12 of storage switches are in orthogonal columns and rows to facilitate mechanical operation of the spring wires 11. In order to sense an open or a closed condition of a switch, each of which comprises a spring wire 11 and a contact 12, a matrix of magnetic cores 13 is arranged so that each of the spring wires extends through a respective one of the cores. Each core 13 couples an address winding for its column to a read winding for its row as described below.

One end of each of the spring wires 11 is firmly imbedded in a base 14 of insulating material. Suitable conductors 15 extend in the direction of the columns in contact with the imbedded ends of respective columns of the spring wires 11. The conductors 15 may be conveniently printed type circuits that are applied to the board on that side opposite the extending spring wires 11. The junctions of the spring wires 11 and the conductors 15 are soldered or welded in a conventional manner.

The spring wires 11 are operated by select bars 16 and latching bars 17. The bars 16 and 17 are parallel with the base 14. The sets of bars are in slightly separated planes, and the distance between the base 14 and whichever set of bars that is chosen to be spaced farthest from the base, is somewhat less than the length of the spring wires 11. The select bars 16 are in line with the columns of the wires. The latching bars 17 are in line with the rows of the wires. Each spring wire 11 extends through an aperture at a respective crossover point of a corresponding select bar 16 and a corresponding latching bar 17. For example, the spring wire **11*a* extends outwardly from the base 14 through an aperture of the latching bar 17*a* and a different shaped aperture of the select bar 16*a***.

Each operated spring 11 is positioned against a contact 12 located at a particular point on the inside edge of one of the apertures through which it extends. In FIG. 1, the contacts 12 are shown in particular angles of respective triangular apertures of the select bars; in FIG. 4, the contacts 29 are shown within particular ends of respective U-shaped apertures or channels of the latching bars. Each of the contacts for a bar are interconnected by a conductor 18 that is conveniently a printed circuit conductor adhering to the surface of the bar. When a spring wire **11*a* is operated, a short-circuiting turn for the inductive coupling device, comprising core 13*a* and its windings, is completed at contact 12*a* through spring wire 11*a*, conductor 15*a*, conductor 19*a*, and conductor 18*a* to the contacts 12*a*. Other spring wires 11*b*, 11*c* and 11*d* in the same column are shown unoperated and therefore not in engagement with their respective contacts 12*b*, 12*c*, and 12*d***.

The bars 16 and 17 for operating the spring wires 11 are operated by magnets in the manner shown in U.S. Patent 2,516,772, Cross Wire Switch, issued to C. N. Hickman on July 25, 1950. According to this cited patent, a hold magnet must remain operated while a selected set of contacts is maintained operated. In the present application, both the magnet for the select bar and the magnet for the latching bar are deenergized after a contact has been selected, and the selected contact then remains closed until the select bar is again operated momentarily. In FIG. 5, a magnet 20 connected to one end of a select bar 16, represents one of the magnets required for respective select bars, and a magnet 21 connected to one end of a latching bar 17, represents one of the magnets required for respective latching bars. Each bar is held in a normal position by a tension spring connected between that end opposite its respective magnet and an adjacent frame. For example, a spring 22 is shown in FIG. 5, connected between an end of the select bar 16 and the switch frame 23 to hold the bar in a released position toward the frame 23. Operation of the magnet 20 moves the bar 16 in the opposite direction to an operate position. Likewise, the latching bar 17 of FIG. 5 is positioned by a similar spring and its respective magnet 21.

Figures 2A, 2B, 2C, 2D:
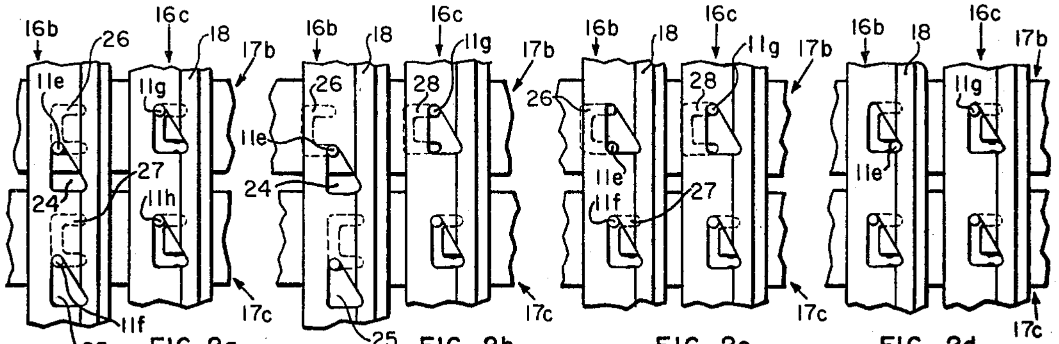

A sequence of operation of a select bar and of a latching bar for selecting a spring wire and holding it operated is shown in FIGS. 2*a*–2*d*. The select bars **16*b* and 16*c* are normally in upward positions in the drawings, and the latching bars 17*b* and 17*c* are normally urged to the right by their return tension springs. If the bars were removed so that the spring wires would be free to be in an unstrained condition, the wires would be in positions upward and to the right of their respective apertures. That is, the wires as a result of their own tensions are urged upward and to the right against the edges of their respective apertures. The spring wire 11*g*** in FIG. 2*a* is in a normal position. It is located in the upper angle of a right triangular aperture of a respective select bar, one leg of the triangle being to the left and the hypotenuse being to the right; and it is located opposite the upper legs of a U-shaped aperture, the base of the U being vertical and to the left.

As a result of the following sequence, the spring wire **11*e* is selected and operated and other spring wires 11*f*–11*h* remain unoperated. First a magnet is operated for moving select bar 16*b* downward. All the spring wires of a column, as represented by spring wires 11*e* and 11*f*, are moved downward as the upper angle of each of the triangular apertures 24 and 25 respectively bear against them. Each of the spring wires in the column of the operated select bar is now in a downward position opposite the lower leg of the respective U-shaped aperture 26 or 27** of the latching bar.

Secondly, the latching bar **17*b* for the row that contains the spring wire 11*e*** is operated to the left as shown in FIG. 2*b* to translate the U-shaped apertures 26 and 28 left relative to the spring wires **11*e* and 11*g*. Since the selected spring wire 11*e* has been positioned downward by operation of the select bar 16*b*, it is now positioned in the right end of the lower leg of the U-shaped aperture 26; whereas the unselected spring wire 11*g* is positioned in the right end of the upper leg of the U-shaped aperture 28**.

Thirdly, the armature for the select bar **16*b* is released so that the bar is returned to its normal upward position. The unselected spring wires for a column, as represented by the spring wire 11*g*, are urged upward by their own tension in the upper angle of the respective triangular apertures and follow the triangle upward in the base of the respective U-shaped aperture 27 to their normal unoperated positions. The selected spring wire 11*e* is held downward by being retained within the lower leg of the U-shaped aperture 26**.

The fourth and final step for operating a selected spring wire **11*e* is the release of the latching bar 17*b*. The bar 17*b* is moved right to its normal position. As the bar 17*b* is moved to the right, the unselected spring wire 11*g* is retained stationary within the upper angle of its respective triangular aperture, but the selected spring wire 11*e* is moved right by its own tension along the bottom leg of its respective triangular opening. The operated spring wire is then in engagement with either a contact 12 in the angle of the triangular aperture, as shown in FIG. 1, or with a contact 29, as shown in FIG. 4, at the end of the lower leg of the U-shaped aperture. The operated spring wire 11*e*** is mechanically latched downward indefinitely by its U-shaped aperture until it is released by operation of a corresponding select magnet.

As illustrated in FIGS. 3*a* and 3*b*, the operated spring wire 11*e* is returned to its normal unoperated position by momentarily displacing the select bar downward. The longest edge of the triangular aperture 24 slants upward to the left from its lower side so as to operate as a cam on the spring wire 11*e* for moving it to the left from the lower leg of the U-shaped aperture 26. As the select bar 16*b* is returned upward to its normal position as shown in FIG. 3*b*, the tension of the spring wire 11*e* causes it to move upward along the base of the U-shaped aperture 26 to its normal position.

Referring again to FIG. 1, a source of pulses 30 is connected through a selector switch 31 to individual address windings 32–35 for the different columns of the cores 13 that are arranged as a matrix on respective spring wires 11 of the switch. Each read winding 36–39 for each row of the cores 13 is connected to the input of a respective one of the amplifiers 40–43, the output of each of which is connected to the input of a respective pulse amplitude discriminator 44–47. The outputs of the discriminators are connected to the input circuits of a utilization device 48, which, for example, may be an outgoing pulsing circuit.

In operation, any column of information, or word, can be erased or deleted by operating its corresponding magnet 20 shown in FIG. 5. Assume that the select bar 16*a* of FIG. 1 has been operated to return the spring wires 11*a*–11*d*, and additional wires not shown, of that column to their normal positions. Subsequently, in order to operate spring wire 11*a* to engage its contact 12*a*, the select bar 16*a* and the latching bars 17*a* are operated in the following sequence as described above: (1) the select bar 16*a* is operated, (2) the latching bar 17*a* is operated, (3) the select bar 16*a* is released, and (4) the latching bar 17*a* is released. Other spring wires 11*b*–11*d* in the same column are unoperated, but still other wires that are not shown in FIG. 1 may be operated to complete a word of information.

In order to read the information stored in the column that includes a spring wire 11*a*, the column is selected by sending operating pulses from a remote operator's position over a control line 48 to the selector switch 31. The operated selector switch connects the source of pulses 30 to the address winding 33 of that column. A single pulse is then applied to the address winding 33 to change the flux in the core 13*a* that encircles the spring wire 11*a* and in the other cores in the same row that encircle spring wires 11*b*, 11*c*, 11*d*, etc., respectively.

The amplitude of the pulses coupled from the address winding 33 to each one of the read windings 36–39 is dependent upon the positions of the spring wire 11*a*–11*d*, associated with the respective row. Since the spring wire 11*a*, when operated, establishes a short-circuiting turn, the amplitude of the pulse induced in the corresponding read winding 36 is substantially less than the amplitude of pulse induced in either of the read windings 37–39 that correspond to unoperated spring wires in the addressed column.

Each of the discriminators 44–47 function to apply an output for one position of the respective spring wire to a respective input of the pulsing circuit 48. In the other positions of the respective spring wire, no output is applied to the respective input of the circuit 48.

What is claimed is:

1. A semipermanent alterable memory comprising:
a crossbar switch having a plurality of parallel conductive spring elements arranged in a matrix,
a magnetic core encircling each of said spring elements,
an electrical contact for each of said spring elements, each of said contacts being mounted for engagement with a contact portion of said respective spring element that extends beyond one face of said corresponding core, said contacts being connected together, the portions of said spring elements that extend beyond the opposite face of said cores being connected together and being connected to all of said contacts,
said crossbar switch being operable to actuate any selected combination of said spring elements into engagement with their said respective contacts for establishing a short-circuiting turn on said respective cores,
an address winding for each column of said cores, each address winding linking each core of the respective column,
a sense winding for each row of said cores, each sense winding linking each core of the respective row,
means for selectively applying a pulse to any one of said address windings, and
a sensing means connected to said sense winding for detecting which ones of said cores in a column has a relatively low output in response to a pulse being applied to said address winding for that column.

2. A semipermanent electromechanical memory comprising:
a crossbar switch having a plurality of crosspoints, each of which includes a set of contacts,
a plurality of magnetic cores, one of which is located at each of said crosspoints,
a write winding on each of said cores, each winding being connected in series with the set of contacts associated with a respective core, whereby each winding is short-circuited upon selective closure of its set of contacts in response to operation of said crossbar switch,
addressing means for inducing a predetermined variation of magnetic force in selected ones of said cores, the resulting change of magnetic flux being greater in those selected cores located at said crosspoints that have their respective contacts open than in those selected cores located at said crosspoints that have their respective contacts closed, and
reading means responsive to flux change to determine which of said contacts located at the crosspoints of said selected cores are closed.

3. A semipermanent electromechanical memory comprising, in combination:
a crossbar switch having a plurality of crosspoints, each of which comprises a spring element and an associated mating contact, said switch being operable to actuate selected ones of said spring elements into engagement with respective ones of said mating contacts,
a plurality of magnetic cores, one of which encircles each of said spring elements which functions as a write winding for the respective core, and
each of said write windings being short-circuited to provide a short-circuited winding about its respective core in response to operation of the respective one of said contacts,
addressing means for inducing a predetermined variation of magnetic force in selected ones of said cores, the resulting change of magnetic flux being greater in those selected cores located at said crosspoints that have their respective contacts open than in those selected cores located at said crosspoints that have their respective contacts closed, and
reading means responsive to flux change to determine which of said contacts located at the crosspoints of said selected cores are closed.

References Cited

UNITED STATES PATENTS 2,814,031 11/1957 Davis ______________ 340—174

BERNARD KONICK, Primary Examiner

S. B. POKOTILOW, Assistant Examiner

U.S. Cl. X.R.

340—166